(12) United States Patent
Harada et al.

(10) Patent No.: US 9,779,886 B2
(45) Date of Patent: Oct. 3, 2017

(54) ELECTRONIC COMPONENT

(71) Applicant: MURATA MANUFACTURING CO., LTD., Nagaokakyo-Shi, Kyoto-fu (JP)

(72) Inventors: Hiroyuki Harada, Nagaokakyo (JP); Masaharu Itaya, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 537 days.

(21) Appl. No.: 14/051,556

(22) Filed: Oct. 11, 2013

(65) Prior Publication Data

US 2014/0111907 A1 Apr. 24, 2014

(30) Foreign Application Priority Data

Oct. 24, 2012 (JP) ................................ 2012-234302

(51) Int. Cl.
| | |
|---|---|
| *H01G 11/14* | (2013.01) |
| *H01G 11/80* | (2013.01) |
| *H01G 11/82* | (2013.01) |
| *H01G 11/74* | (2013.01) |

(52) U.S. Cl.
CPC ............ *H01G 11/74* (2013.01); *H01G 11/80* (2013.01); *H01G 11/82* (2013.01); *Y02E 60/13* (2013.01)

(58) Field of Classification Search
CPC ........ H01G 11/14; H01G 11/80; H01G 11/82; Y02E 60/13
USPC ....................................................... 361/502
See application file for complete search history.

(56) References Cited

U.S. PATENT DOCUMENTS

| | | | |
|---|---|---|---|
| 7,030,496 B2 | 4/2006 | Shinyama et al. | |
| 2004/0022043 A1* | 2/2004 | Sakai | H01L 23/49822 361/795 |
| 2005/0207095 A1* | 9/2005 | Omura | H01G 9/016 361/502 |
| 2011/0102972 A1 | 5/2011 | Jung et al. | |

FOREIGN PATENT DOCUMENTS

| | | |
|---|---|---|
| JP | 2000-294454 A | 10/2000 |
| JP | 2005-033131 A | 2/2005 |
| JP | 2011-100998 A | 5/2011 |
| JP | 2012-156298 A | 8/2012 |

\* cited by examiner

*Primary Examiner* — Eric Thomas
*Assistant Examiner* — Michael P McFadden
(74) *Attorney, Agent, or Firm* — Arent Fox LLP

(57) ABSTRACT

An electronic component includes an external terminal member made of a conductive metal and an insulating section in contact with the external terminal member. The external terminal member includes an exposed portion which faces outside and which is located on the predetermined surface side thereof. The electronic component is fixed with solder applied to the exposed portion of the external terminal member. The exposed portion of the external terminal member is given by a base plating film made of nickel or a nickel alloy and an outer plating film which is placed on the base plating film and which is made of gold, tin, or an alloy containing at least one of gold and tin. The outer plating film includes a relatively thick region and a relatively thin region surrounding the relatively thick region.

22 Claims, 3 Drawing Sheets

PRIOR ART

ELECTRONIC COMPONENT

CROSS REFERENCE TO RELATED APPLICATION

The present application claims priority to Japanese Patent Application No. 2012-234302, filed Oct. 24, 1012, the entire contents of which are incorporated herein by reference.

FIELD OF THE INVENTION

The present invention relates to electronic components. The present invention particularly relates to an electronic component which includes an insulating section that is electrically insulating and also includes an external terminal member embedded in the insulating section, the electronic component being fixed with solder applied to the external terminal member.

BACKGROUND OF THE INVENTION

Japanese Unexamined Patent Application Publication No. 2011-100998 (hereinafter referred to as Patent Document 1) discloses a technique that is of interest to the present invention. In particular, FIGS. 1, 3A, and 3B in Patent Document 1 show a case, including a concave body and a lid, for electric double-layer capacitors. The case is made of resin and holds an external terminal member embedded therein. FIG. 5 shows a case 2 in cross section. The case 2 is one obtained by generalizing the above structure, serves as an insulating section, and holds an external terminal member 1 embedded therein.

As illustrated in FIG. 5, an electronic component 3 including the external terminal member 1 and the case 2 is mounted on a mounting substrate 4 in such a way that solder 7 is provided between a conductive land 6 placed on the mounting substrate 4 and an exposed portion 5 of the external terminal member 1 that is directed outward and reflowing is then performed. In this operation, the solder 7 is melted and protrudes outside the exposed portion 5 of the external terminal member 1 to spread along the lower surface of the case 2 as illustrated in FIG. 5. The contact of the case 2 with the high-temperature melted solder 7 may possibly cause such a failure that the case 2 is partly melted or a crack 8 is formed in the case 2.

In the electronic component 3, in which the case 2 contains a capacitor element and an organic electrolyte solution and the entry of water from outside is strictly inhibited like, for example, an electric double-layer capacitor containing an organic electrolyte solution, the presence of the crack 8 may possibly cause a problem such as a reduction in dielectric strength.

SUMMARY OF THE INVENTION

Accordingly, it is an object of the present invention to provide an electronic component in which a problem such as the melting or cracking of an insulating section due to high-temperature melted solder as described above is unlikely to occur.

The present invention is directed to an electronic component including an external terminal member made of a conductive metal and an insulating section in contact with the external terminal member. The external terminal member includes an exposed portion which faces outside and which is located on the predetermined surface side thereof. The electronic component is fixed with solder applied to the exposed portion of the external terminal member. In order to solve the above problem, the electronic component has a configuration below.

That is, in the electronic component, the exposed portion of the external terminal member is given by a base plating film made of nickel or a nickel alloy and an outer plating film which is placed on the base plating film and which is made of gold, tin, or an alloy containing at least one of gold and tin. The outer plating film includes a relatively thick region and a relatively thin region surrounding the relatively-thick region. In other words, the outer plating film includes a peripheral portion which is relatively thin and a central portion which is relatively thick.

The reason why the expression "the outer plating film includes a peripheral portion which is relatively thin and a central portion which is relatively thick" is not used to define the present invention is that the boundary between the peripheral portion and the central portion cannot be clearly determined and therefore it is unclear that where the peripheral portion is and where the central portion is. Thus, the expression "the outer plating film includes a relatively thick region and a relatively thin region surrounding the relatively thick region" is used to define the present invention.

The outer plating film is made of gold, tin, or the alloy containing at least one of gold and tin so as to have good solder wettability. The amount of metal having good solder wettability in the relatively thin region is small and nickel or the nickel alloy, which is contained in the base plating film, is likely to be oxidized. Therefore, the periphery of the exposed portion of the external terminal member is reduced in solder wettability, the periphery thereof allowing the relatively thin region to be located thereon. Therefore, the spread of solder can be suppressed.

The outer plating film preferably has cracks in the relatively thin region. The presence of the cracks in the outer plating film promotes the oxidation of nickel or the nickel alloy, which is contained in the base plating film. Therefore, the periphery of the exposed portion of the external terminal member can be reliably reduced in solder wettability.

The external terminal member includes a central portion and a peripheral portion which is less in thickness than the central portion as measured in the thickness direction of the outer plating film. This configuration allows the interface distance of the junction of the external terminal member and the insulating section to be long and the water permeability of the junction to be low.

The electronic component may further include an element body electrically connected to the external terminal member and a case accommodating the element body. The insulating section preferably forms at least one portion of the case.

The present invention is advantageously applied to an electric double-layer capacitor containing an organic electrolyte solution.

According to preferred embodiments of the present invention, the periphery of the exposed portion of the external terminal member can be reduced in solder wettability and therefore the spread of solder can be suppressed. Hence, the following failure can be made unlikely to occur: a failure such as the partial melting or cracking of the insulating section due to the contact of high-temperature melted solder with the insulating section.

When the electronic component further includes the element body electrically connected to the external terminal member and the case accommodating the element body and the insulating section preferably forms at least one portion of the case, the entry of water into the case can be made unlikely to occur according to preferred embodiments of the present invention.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
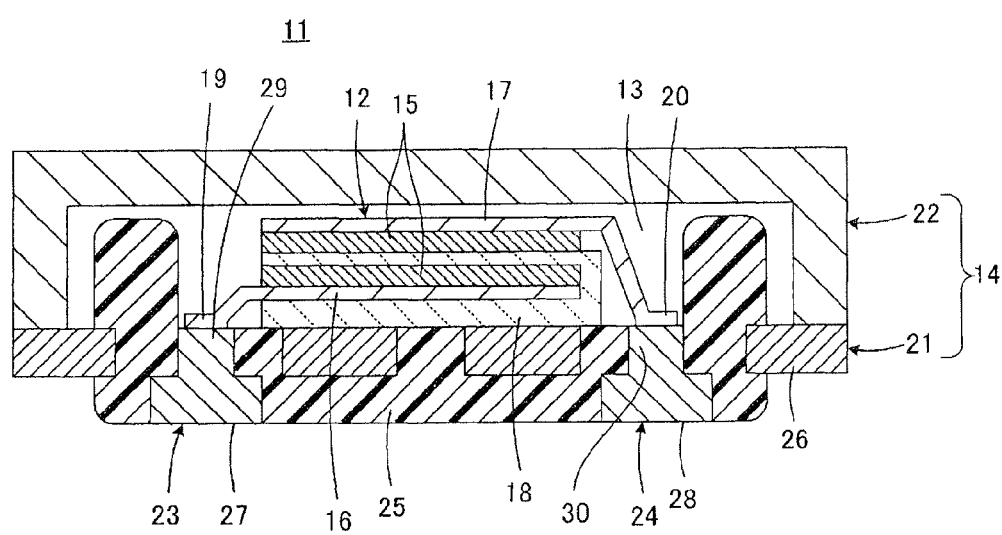
FIG. 1 is a sectional view of an electric double-layer capacitor corresponding to an electronic component according to an embodiment of the present invention.

An electronic component according to an embodiment of the present invention includes an external terminal member made of a conductive metal and an insulating section in contact with the external terminal member, the external terminal member including an exposed portion which faces outside and which is located on the predetermined surface side thereof. The electronic component corresponds to, for example, an electric double-layer capacitor 11 shown in FIG. 1.

The electric double-layer capacitor 11 includes a capacitor element 12 serving as an element body, a case 14 defining an enclosed space 13 for accommodating the capacitor element 12, and an electrolyte solution (not shown) filled in the enclosed space 13.

The capacitor element 12 includes an active material 15, a first current collector 16, a second current collector 17 facing the first current collector 16 with the active material 15 interposed therebetween, and a separator 18 separating the active material 15 into a first current collector 16 side and a second current collector 17 side. An end portion of the first current collector 16 and an end portion of the second current collector 17 are each located at a corresponding one of two ends of the capacitor element 12 and form a first element terminal 19 and a second element terminal 20, respectively.

The active material 15 contains, for example, activated carbon. The first and second current collectors 16 and 17 are made from aluminum foil. One of the first and second current collectors 16 and 17 serves as a negative electrode and the other one serves as a positive electrode. The separator 18 is made of a porous material allowing the electrolyte solution to pass through. Examples of the porous material include resins such as polyimide, polyamideimide, polypropylene, and polyethylene and paper. The active material 15 and the separator 18 are impregnated with the electrolyte solution, which is filled in the enclosed space 13. Examples of the electrolyte solution include aqueous electrolyte solutions, organic electrolyte solutions, and ionic liquids.

Figure 2:
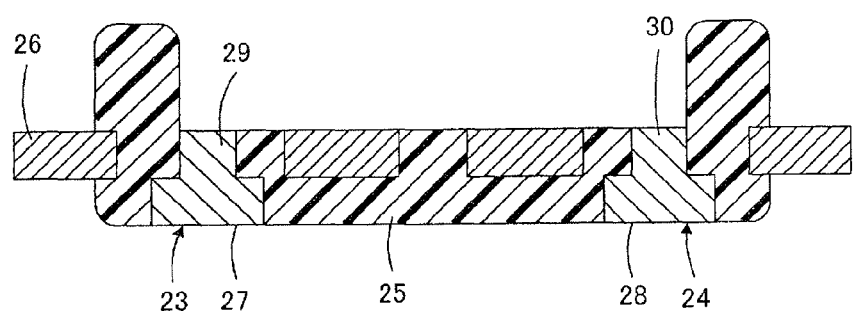
FIG. 2 is a sectional view of a body of a case included in the electric double-layer capacitor shown in FIG. 1.

The case 14 includes a body 21 and a lid 22. FIG. 2 shows the body 21 alone.

The body 21 is electrically connected to the first and second element terminals 19 and 20 and includes a first external terminal member 23 and second external terminal member 24 extending through the body 21 in the thickness direction of the body 21. The body 21 further includes an insulating section 25 which is made of an electrically insulating resin and which is in contact with the first and second external terminal members 23 and 24. In this embodiment, the insulating section 25 holds the first and second external terminal members 23 and 24 in such a state that the first and second external terminal members 23 and 24 are embedded in the insulating section 25. The body 21 further includes a metal plate 26 which forms a peripheral portion of the body 21 and which includes a central portion layered on the insulating section 25.

The insulating section 25 electrically insulates the first and second external terminal members 23 and 24 from each other and also electrically insulates the first and second external terminal members 23 and 24 from the metal plate 26.

The first and second external terminal members 23 and 24 and the metal plate 26 are made of, for example, a conductive metal such as aluminum or an aluminum alloy. The first and second external terminal members 23 and 24 include an exposed portion 27 and exposed portion 28, respectively, facing outside and also include a base portion 29 and base portion 30, respectively, exposed inside. The base portions 29 and 30 are located in the insulating section 25. The first and second external terminal members 23 and 24 each include a central portion and a peripheral portion which is less in thickness than the central portion as measured in the thickness direction of an outer plating film 33 below and are substantially inversely T-shaped as illustrated in FIGS. 1 and 2.

The first and second external terminal members 23 and 24 and the exposed portions 27 and 28 are plated as described below in detail with reference to FIGS. 3 and 4.

The insulating section 25 is made of, for example, polyether ether ketone (PEEK), polyphenylene sulfide (PPS), a liquid crystal polymer (LCP), polypropylene, polyethylene, polyethylene terephthalate, polybutylene terephthalate (PBT), polyvinyl chloride, fluororesin, an acrylic resin, or the like.

The lid 22 of the case 14 is made of, for example, aluminum or an aluminum alloy and has a liquid inlet (not shown) for introducing the electrolyte solution into the case 14. The liquid inlet is closed after the case 14 is filled with the electrolyte solution.

The electric double-layer capacitor 11 is fixed by applying solder to the exposed portion 27 of the first external terminal member 23 and the exposed portion 28 of the second external terminal member 24.

The first and second external terminal members 23 and 24 have a configuration characteristic of the present invention. A method for manufacturing the first and second external terminal members 23 and 24 is described below with reference to FIGS. 3A and 3B, whereby the configuration of the first and second external terminal members 23 and 24 is made apparent. The first and second external terminal members 23 and 24 have substantially the same configuration and are manufactured in substantially the same way. Therefore, a method for manufacturing the first external terminal member 23 is described herein.

Figure 3A:
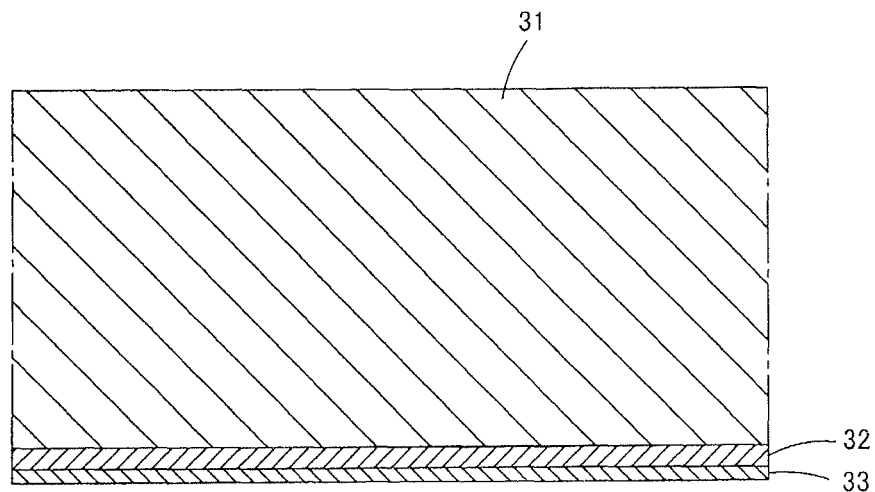
FIGS. 3A and 3B are sectional views illustrating a method for manufacturing a first external terminal member included in the electric double-layer capacitor shown in FIG. 1.

As illustrated in FIG. 3A, a plate 31 made of a conductive metal is prepared. The plate 31 has a principal surface overlaid with a base plating film 32 made of nickel or a nickel alloy. The base plating film 32 is overlaid with an outer plating film 33 made of gold, tin, or an alloy containing at least one of gold and tin. In an example, the plate 31 has a thickness of about 0.5 mm and is made of aluminum, the base plating film 32 has a thickness of about 0.66 µm and is made of nickel, and the outer plating film 33 has a thickness of about 0.03 µm to 0.10 µm and is made of gold. Alternatively, the outer plating film 33 may have a thickness of about 3.42 µm and may be made of tin instead of gold.

Figure 3B:
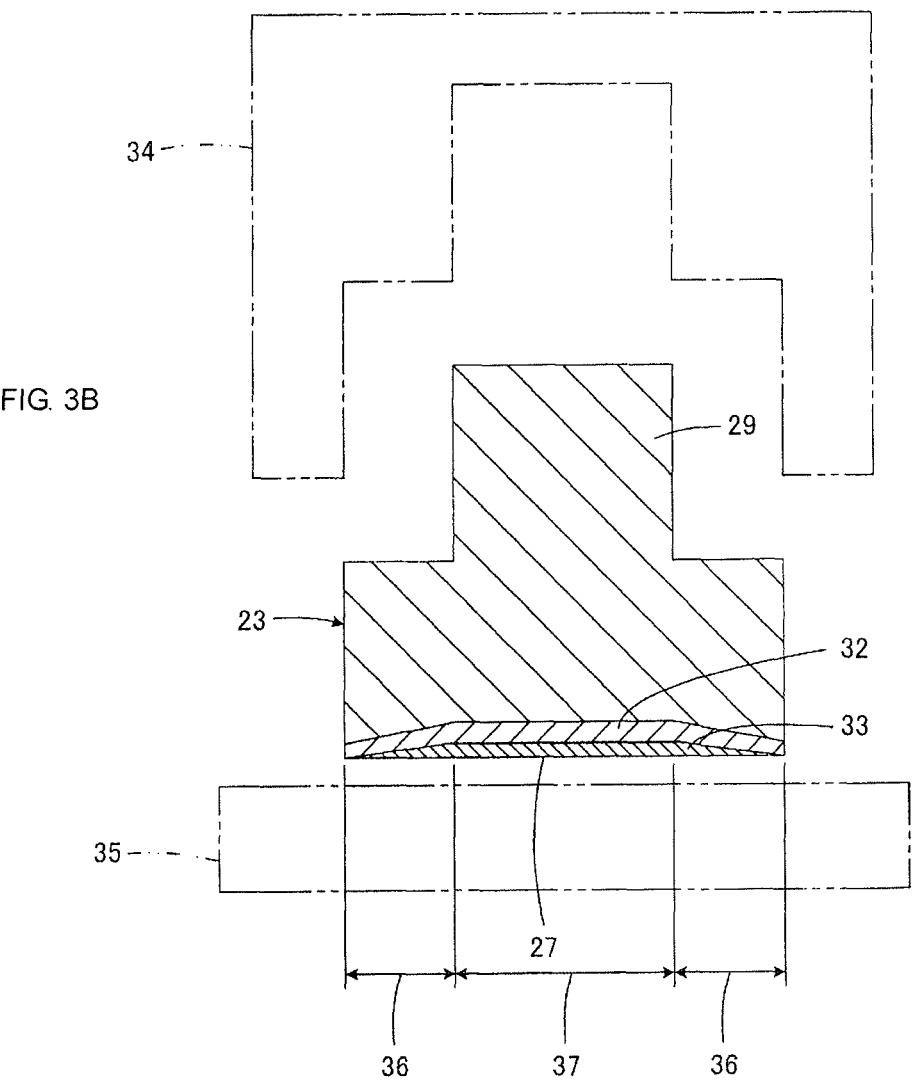

Thereafter, the plate 31 is subjected to progressive pressing, whereby the first external terminal member 23 is obtained as desired. FIG. 3B shows the first external terminal member 23 that has been subjected to a step included in progressive pressing.

Referring to FIG. 3B, the plate 31 is fed between an upper die 34 and lower die 35, drawn with a phantom line, forming a press mold and is press-formed in such a way that the upper die 34 and the lower die 35 are made to approach each other, whereby the first external terminal member 23 is obtained with the plate 31 partly connected thereto. The first external terminal member 23 has such substantially an inverted T-shape that the cross-sectional area of the exposed portion 27 is greater than the cross-sectional area of the base portion 29.

In the above press forming, a peripheral portion of a region of the plate 31 is reduced in thickness, the region being to be formed into the first external terminal member 23. Therefore, peripheral portions of the base and outer plating films 32 and 33, particularly the outer plating film 33, are also reduced in thickness. This results in that a relatively thick region 37 and a relatively thin region 36 surrounding the relatively thick region 37 are formed in the outer plating film 33.

The first external terminal member 23 is preferably surface-treated as described below.

An aqueous solution containing at least one of ammonia ($NH_3$), hydrazine ($N_2H_4$), and a water-soluble amine compound is prepared. The plate 31 having the first external terminal member 23 is immersed in the aqueous solution. After being taken out of the aqueous solution, the plate 31 is washed with water and is then dried. This treatment forms fine recesses with a size of 20 nm to 60 nm in the surface of the first external terminal member 23. The presence of the fine recesses creates an anchoring effect to contribute to enhancing the bonding strength between the first external terminal member 23 and the insulating section 25.

A blanking step is then performed, whereby the first external terminal member 23 is completely separated from the plate 31.

Figure 4A:
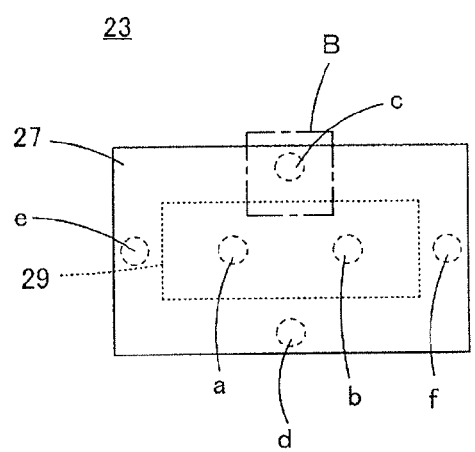
FIG. 4A is a bottom view of the first external terminal member shown in FIG. 3B.
Figure 4B:
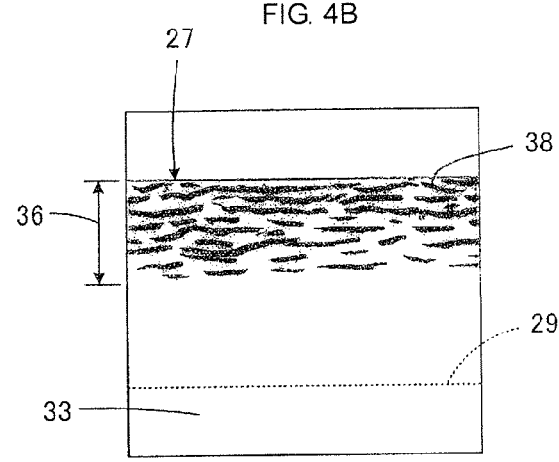
FIG. 4B is an enlarged view of a part B of FIG. 4A.
Figure 5:
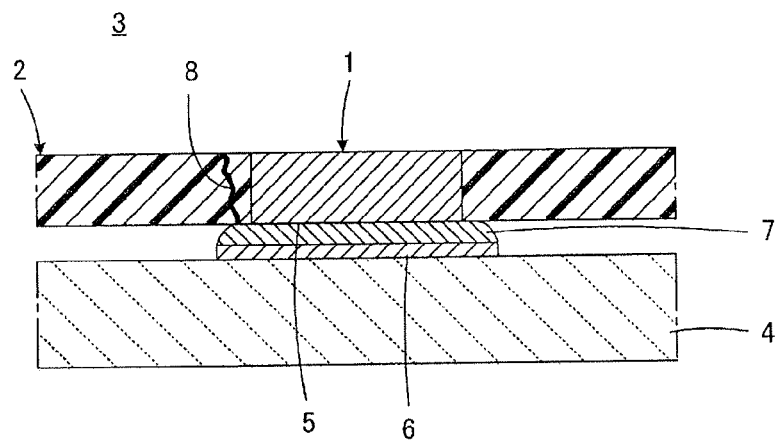
FIG. 5 is one for describing a problem of a related technique and is a sectional view illustrating such a state that an external terminal member is embedded in a case serving as an insulating section.

FIG. 4A shows the lower surface of the first external terminal member 23, that is, a surface of the exposed portion 27 thereof. FIG. 4B shows a part B of FIG. 4A in an enlarged view. As illustrated in FIG. 4B, the outer plating film 33 preferably has a large number of fine cracks 38, shown in black, in the relatively thin region 36. The fine cracks 38 are probably formed during press forming using the upper die 34 and the lower die 35. The presence of the fine cracks 38 promotes the oxidation of nickel or the nickel alloy contained in the base plating film 32. Therefore, the periphery of the exposed portion 27 of the first external terminal member 23 can be reliably reduced in solder wettability.

The first external terminal member 23 is as described above with reference to FIGS. 3A, 3B, 4A, and 4B. The above applies to the second external terminal member 24.

A method for manufacturing the electric double-layer capacitor 11 using the first and second external terminal members 23 and 24 obtained as described above will now be described.

The capacitor element 12 is prepared. The body 21 and lid 22, which form the case 14, are prepared.

Upon the preparation of the body 21, the first and second external terminal members 23 and 24 are prepared and the metal plate 26 is also prepared.

The first and second external terminal members 23 and 24 and the metal plate 26 are inserted in an injection mold, which is not shown, whereby the insulating section 25 is injection-molded.

The capacitor element 12 is provided on the body 21.

The first and second element terminals 19 and 20 of the capacitor element 12 are bonded to the first and second external terminal members 23 and 24, respectively, by, for example, ultrasonic welding, the first and second external terminal members 23 and 24 being located on the body 21 side.

The lid 22 is provided on the body 21. A peripheral portion of the body 21 that is given by the metal plate 26 is bonded to end portions of side wall sections of the lid 22 by, for example, laser welding.

The electrolyte solution is introduced into the liquid inlet formed in the lid 22, whereby the case 14 is filled with the electrolyte solution. After vacuum impregnation is performed, the liquid inlet is closed, whereby the case 14 is sealed.

The electric double-layer capacitor 11 is completed as described above.

In the case where the present invention is applied to the electric double-layer capacitor 11 and the electric double-layer capacitor 11 contains an organic electrolyte solution, the effect of suppressing the entry of water due to the present invention is particularly effective. This is because the entry of water from outside reduces the dielectric strength of the electric double-layer capacitor 11 containing the organic electrolyte solution and therefore needs to be strictly inhibited.

While the present invention has been described above in relation to an electric double-layer capacitor, the present invention is not limited to the electric double-layer capacitor. The present invention can be applied to any electronic component including an external terminal member made of a conductive metal and an insulating section which holds the external terminal member in such a state that the external terminal member is embedded therein, the external terminal member including an exposed portion which faces outside and which is located on the predetermined surface side thereof, the electronic component being fixed with solder applied to the exposed portion of the external terminal member.

Accordingly, in an electronic component, an insulating section need not form a portion of a case and may form, for example, a solid tabular body.

EXAMPLES

Examples performed in order to confirm an effect due to the present invention are described below.

1. Preparation of Samples

Example

Aluminum plates with a thickness of about 0.5 mm were prepared. After being subjected to zincate treatment, a matte nickel plating film, serving as a base plating film, having a thickness of about 0.66 μm was formed on a principal surface of each aluminum plate. A gold plating film, serving as an outer plating film, having a thickness of about 0.15 μm was formed on the matte nickel plating film. Thereafter, press forming described with reference to FIGS. 3A and 3B and the like were performed, whereby an external terminal member according to an example was obtained.

Comparative Example

Aluminum plates, having a thickness of about 0.5 mm, similar to those used in the example were prepared. Subsequently, press forming similar to that described with reference to FIGS. 3A and 3B and the like were performed, whereby unplated external terminal members having substantially the same shape as that of the external terminal member according to the example were obtained. After a masking was provided on a surface of each unplated external terminal member that was not to be coated with any plating film, a matte nickel plating film, serving as a base plating film, having a thickness of about 0.66 μm was formed on a surface of the unplated external terminal member that was to be an exposed portion. A gold plating film, serving as an outer plating film, having a thickness of about 0.15 μm was formed on the matte nickel plating film. Thereafter, the masking was removed, whereby an external terminal member according to a comparative example was obtained.

2. Measurement of Thickness of Plating Film

The gold plating film of each of the external terminal members according to the example and the comparative example was measured for chart using an X-ray analytical microscope and the thickness thereof was calculated from detected element peaks. The thickness was calculated for positions corresponding to a, b, c, d, e, and f shown in FIG. 4A. Obtained results are shown in Table 1.

TABLE 1

| Measurement position | Example | Comparative Example |
|---|---|---|
| a | 0.14 | 0.15 |
| b | 0.15 | 0.15 |
| c | 0.06 | 0.16 |
| d | 0.07 | 0.17 |
| e | 0.06 | 0.17 |
| f | 0.06 | 0.17 |

(unit: μm)

As is clear from Table 1, in the comparative example, there is no significant difference in thickness between the positions corresponding to a, b, c, d, e, and f shown in FIG. 4A. In the example, the thickness of the positions corresponding to c, d, e, and f, which surround a and b, is less than or equal to half the thickness of the positions corresponding to a and b. That is, the thickness of peripheral portions is less than or equal to substantially half the thickness of central portions.

3. Test for Spread of Solder

Reflow substrates, made of alumina, having a planar size of 102 mm×102 mm and a thickness of 0.635 mm were prepared. Each of the external terminal members according to the example and the comparative example was fixed on a corresponding one of the reflow substrates using a heat-resistant double-faced adhesive tape in such a state that an exposed portion thereof was directed upward.

Flux containing rosin and isopropyl alcohol at a weight ratio of 15:75 was prepared. The flux was supplied to the exposed portion of each of the external terminal members according to the example and the comparative example using a micro-pipetter. The amount of the flux supplied to the exposed portion thereof was about 10 μL.

A solder ball having a diameter of about 1.0 mm and a composition containing Sn, Ag, and Cu at a ratio of 1:3.0:0.5 was provided on the exposed portion of each of the external terminal members according to the example and the comparative example and reflowing was then performed. In the reflowing, the solder ball was preheated at a temperature about 150° C. to 180° C. for about 73 seconds and was then heated at a temperature of about 220° C. or higher, a peak temperature of about 237.7° C., for about 53 seconds.

Thereafter, each external terminal member was washed with isopropyl alcohol, was observed, and was then measured, whereby the spreading area of solder was determined. Obtained results are shown in Table 2. The reason why there are "No. 1" and "No. 2" for each of "example" and "comparative example" in Table 2 is that two samples were evaluated in each of "example" and "comparative example".

TABLE 2

|  | No. 1 | No. 2 |
|---|---|---|
| Example | 7.675803 | 7.634095 |
| Comparative Example | 9.139775 | 9.560677 |

(unit: mm²)

As is clear from Table 2, the example is less in solder spreading area than the comparative example, meaning that the periphery of the exposed portion of each external terminal member according to the example has low solder wettability. The exposed portion of each of the external terminal members according to the example and the comparative example has an area of about 26.4 mm².

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. An electronic component comprising:
   a lid; and
   a body coupled to the lid to define an enclosed space therebetween, the body comprising:
   a first conductive terminal member having an exposed portion disposed on a surface of the first conductive terminal member that faces away from the enclosed space, and
   an insulating section adjacent to the first conductive terminal member,
   wherein the exposed portion of the first conductive terminal member comprises a base plating film and an outer plating film disposed on the base plating film,
   wherein the outer plating film has a central portion with a first thickness and a peripheral portion with a second thickness less than the first thickness, and
   wherein the central portion and the peripheral portion of the outer plating film both cover the base plating film and are both part of the first conductive terminal that faces outside the electronic component.

2. The electronic component according to claim 1, wherein the electronic component is fixed with solder applied to the exposed portion of the first conductive terminal member.

3. The electronic component according to claim 1, wherein the base plating film is formed from the group consisting of nickel and a nickel alloy.

4. The electronic component according to claim 3, wherein the outer plating film is formed from the group consisting of gold, tin, and an alloy containing at least one of gold and tin.

5. The electronic component according to claim 1, wherein the outer plating film has cracks in the peripheral portion.

6. The electronic component according to claim 1, further comprising an element body electrically disposed in the enclosed space.

7. The electronic component according to claim 6, wherein the element body comprises:
a first current collector;
a second current collector facing the first current collectors;
an active material interposed between the first current collector and the second current collector; and
a separator that separates the active material.

8. The electronic component according to claim 7, wherein the separator separates the active material into a first layer adjacent the first current collector and a second layer adjacent the second current collector.

9. The electronic component according to claim 7, wherein the separator comprises a porous material selected from the group consisting a polyimide resin, a polyamideimide resin, a polypropylene resin, a polyethylene resin and a paper.

10. The electronic component according to claim 7, wherein the active material and the separator are impregnated with an electrolyte solution selected from the group consisting of an aqueous electrolyte solution, an organic electrolyte solution, and an ionic liquid.

11. The electronic component according to claim 7, wherein the body further comprises a second conductive terminal member having an exposed portion disposed on a surface of the second conductive terminal member that faces away from the enclosed space.

12. The electronic component according to claim 11, wherein the first and second conductive terminal members each comprise base portions opposite the respective exposed portions.

13. The electronic component according to claim 12,
wherein the first current collector comprises a first end portion coupled to the base portion of the first conductive terminal member, and
wherein the second current collector comprises a second end portion coupled to the base portion of the second conductive terminal member.

14. The electronic component according to claim 1, wherein the electronic component is an electric double-layer capacitor containing an organic electrolyte solution.

15. The electronic component according to claim 1, wherein the first conductive terminal is inversely T-shaped.

16. An electronic component comprising:
a lid; and
a body coupled to the lid to define an enclosed space therebetween, the body comprising:
a pair of conductive terminal members each having an exposed portion that faces away from the enclosed space, and
an insulating section that insulates the pair of conductive terminal members from each other,
wherein the exposed portion of each of the pair of conductive terminal members comprises a base plating film and an outer plating film disposed on the base plating film,
wherein the outer plating film of each of the pair of conductive terminal members decreases in thickness towards a peripheral portion of the respective outer plating film, and
wherein the entire outer plating film of each conductive terminal member including the respective peripheral portions covers the base plating film of the conductive terminal member.

17. The electronic component according to claim 16, further comprising an element body disposed in the enclosed space, the element body having:
a first current collector;
a second current collector facing the first current collector;
an active material interposed between the first current collector and the second current collector; and
a separator that separates the active material.

18. The electronic component according to claim 17, wherein each of the pair of conductive terminal members comprises a base portion opposite the respective exposed portion.

19. The electronic component according to claim 18,
wherein the first current collector comprises a first end portion coupled to the base portion of the first conductive terminal member, and
wherein the second current collector comprises a second end portion coupled to the base portion of the second conductive terminal member.

20. The electronic component according to claim 16, wherein each of the pair of conductive terminal members is inversely T-shaped.

21. The electronic component according to claim 1, wherein the outer plating film has a flat outer surface opposite the base plating film.

22. The electronic component according to claim 16, wherein the outer plating film of each conductive terminal member has a flat outer surface opposite the respective base plating film.

* * * * *